US012803389B2

(12) United States Patent
Feng et al.

(10) Patent No.: US 12,803,389 B2
(45) Date of Patent: Nov. 17, 2026

(54) HUB MOTOR ASSEMBLY

(71) Applicant: J.D COMPONENTS CO., LTD., Chang Hua Hsien (TW)

(72) Inventors: Pin-Chieh Feng, Chang Hua Hsien (TW); Chia-Hung Hsu, Chang Hua Hsien (TW)

(73) Assignee: J.D COMPONENTS CO., LTD., Chang Hua Hsien (TW)

( * ) Notice: Subject to any disclaimer, the term of this patent is extended or adjusted under 35 U.S.C. 154(b) by 171 days.

(21) Appl. No.: 18/810,967

(22) Filed: Aug. 21, 2024

(65) Prior Publication Data

US 2025/0070622 A1 Feb. 27, 2025

(30) Foreign Application Priority Data

Aug. 25, 2023 (TW) ................................ 112209139

(51) Int. Cl.
*H02K 11/30* (2016.01)
*H02K 7/00* (2006.01)
*H02K 11/00* (2016.01)

(52) U.S. Cl.
CPC ......... *H02K 11/0094* (2013.01); *H02K 7/003* (2013.01); *H02K 11/30* (2016.01); *H02K 2211/03* (2013.01)

(58) Field of Classification Search
CPC .... H02K 7/003; H02K 11/0094; H02K 11/30; H02K 2213/03
USPC ........................................ 310/68 R, 71, 75 R
See application file for complete search history.

(56) References Cited

U.S. PATENT DOCUMENTS

| | | | | |
|---|---|---|---|---|
| 4,181,867 A * | 1/1980 | Muller | H02K 29/08 | 310/90 |
| 11,888,378 B1 * | 1/2024 | Bonny | H02K 11/215 | |
| 2010/0137094 A1 * | 6/2010 | Pohl | B62M 6/65 | 475/149 |
| 2012/0065825 A1 | 3/2012 | Nicoson | | |
| 2012/0083375 A1 * | 4/2012 | Lo | B60K 7/0007 | 475/149 |
| 2013/0106115 A1 * | 5/2013 | Liao | H02K 7/183 | 290/1 B |
| 2016/0087491 A1 * | 3/2016 | Duhamel | B60B 1/02 | 310/90 |
| 2017/0331355 A1 * | 11/2017 | He | H02K 1/187 | |

(Continued)

FOREIGN PATENT DOCUMENTS

KR 20120096634 A * 8/2012 ............. H02K 16/02

*Primary Examiner* — Rashad H Johnson
(74) *Attorney, Agent, or Firm* — MUNCY, GEISSLER, OLDS & LOWE, P.C.

(57) ABSTRACT

A hub motor assembly includes a hub motor, a coupling shaft, and a power cable. The hub motor has a hub shell, a motor disposed in the hub shell, and a circuit board fixed to the motor. The coupling shaft is inserted in a first shaft hole of the hub shell and fixed to the motor and provide with a second shaft hole, a notch radially connected to the second shaft hole, and an inner annular portion radially protruding from the periphery wall of the second shaft hole and having multiple wire holes. The power cable has multiple core wires inserted into the second shaft hole through the notch and inserted into the hub shell through the wire holes to be electrically connected to the circuit board. As such, the hub motor assembly of the present invention can achieve an effect of convenient assembly of the power cable.

6 Claims, 5 Drawing Sheets

(56) References Cited

U.S. PATENT DOCUMENTS

| | | | | |
|---|---|---|---|---|
| 2017/0334516 | A1* | 11/2017 | Ferguson | A61G 5/04 |
| 2019/0084406 | A1* | 3/2019 | Takemoto | B60K 17/046 |
| 2019/0097488 | A1* | 3/2019 | Yamada | H02K 5/165 |
| 2019/0185106 | A1* | 6/2019 | Lin | B60B 1/003 |
| 2019/0305625 | A1* | 10/2019 | Mao | H02K 1/2795 |
| 2019/0305627 | A1* | 10/2019 | Yoshino | F04D 25/0646 |
| 2019/0305650 | A1* | 10/2019 | Tanaka | H02K 9/06 |
| 2022/0055715 | A1* | 2/2022 | Meggiolan | H02K 7/08 |
| 2022/0135179 | A1* | 5/2022 | Lee | B62M 11/16 180/206.6 |
| 2022/0363092 | A1* | 11/2022 | Copeland | B60L 53/126 |
| 2022/0388598 | A1* | 12/2022 | Lee | B62L 1/005 |
| 2022/0388599 | A1* | 12/2022 | Lee | H02K 1/146 |
| 2023/0068251 | A1* | 3/2023 | Dodman | B62J 43/20 |
| 2023/0174194 | A1* | 6/2023 | Hahn | B62M 6/50 |
| 2023/0406446 | A1* | 12/2023 | Feng | B62M 6/65 |
| 2024/0186845 | A1* | 6/2024 | Wood | H02K 11/33 |

* cited by examiner

HUB MOTOR ASSEMBLY

BACKGROUND OF THE INVENTION

1. Field of the Invention

The present invention relates to hub motors and more particularly, to a hub motor assembly that allows for convenient assembly of a power cable.

2. Description of the Related Art

US 2012/0065825 discloses that the motor-generator cable is routed from the motor-generator stator through a wire channel created by a longitudinal groove cut into the motor-generator shaft and a replaceable wheel bearing bushing. However, when the motor-generator cable is inserted into the wire channel, the angle may cause the motor-generator cable to bend at nearly 90 degrees. This not only makes the motor-generator cable assembly difficult but also increases the risk of the motor-generator cable wearing out during use. As such, there is still room for structural improvement in the aforesaid patent.

SUMMARY OF THE INVENTION

It is one objective of the present invention to provide a hub motor assembly, which facilitates assembly of a power cable and ensures that the power cable is not easily damaged.

To attain the above objective, the hub motor assembly of the present invention comprises a hub motor, a coupling shaft, and a power cable. The hub motor includes a hub shell, a motor, and a circuit board. One end of the hub shell has a first shaft hole. The motor is disposed in the hub shell and has an outer end surface facing the first shaft hole. The circuit board is disposed in the hub shell and fixed to the outer end surface of the motor. The coupling shaft has a second shaft hole, a notch radially communicating with the second shaft hole, and an inner annular portion radially protruding from a periphery wall of the second shaft hole and having a plurality of wire holes arranged in a spaced manner. The power cable has a plurality of core wires electrically connected to the circuit board in such a way that one ends of the core wires are inserted in the second shaft hole through the notch of the coupling shaft, and inserted in the hub shell through the wire holes of the coupling shaft.

It can be seen from the above that the hub motor assembly of the present invention uses the wire holes to separate the core wires and then fix them to the circuit board. This not only facilitates assembly of the power cable but also prevents the power cable from being bent at excessive angles, thereby reducing the risk of damage.

Preferably, the coupling shaft includes an outer shaft portion inserted into the first shaft hole of the hub shell and having the notch, the second shaft hole, and the inner annular portion, and a wing portion connected to an outer surface of the outer shaft portion and fixed to the outer end surface of the motor by screw locking.

Preferably, the coupling shaft further includes an inner shaft portion extending from an inner periphery of the inner annular portion towards the notch along an axial direction of the second shaft hole, such that the core wires are located between the inner shaft portion and the outer shaft portion. In this way, the core wires and a quick-release shaft inserted into the inner shaft portion can be separated from each other to prevent the two from interfering with each other and causing damage to the core wires.

Preferably, an adhesive is poured between the inner shaft portion and the outer shaft portion to secure the core wires. This improves the structural stability of the power cable and prevents it from loosening easily.

Preferably, an adhesive is poured in the wire holes to secure the core wires. This improves the structural stability of the power cable and prevents it from loosening easily.

Preferably, an end cap is mounted to the coupling shaft and closing one end opening of the second shaft hole. This prevents external foreign matter from entering the second shaft hole.

Other advantages and features of the present invention will be fully understood by reference to the following specification in conjunction with the accompanying drawings, in which like reference signs denote like components of structure.

DETAILED DESCRIPTION OF THE INVENTION

Figure 1:
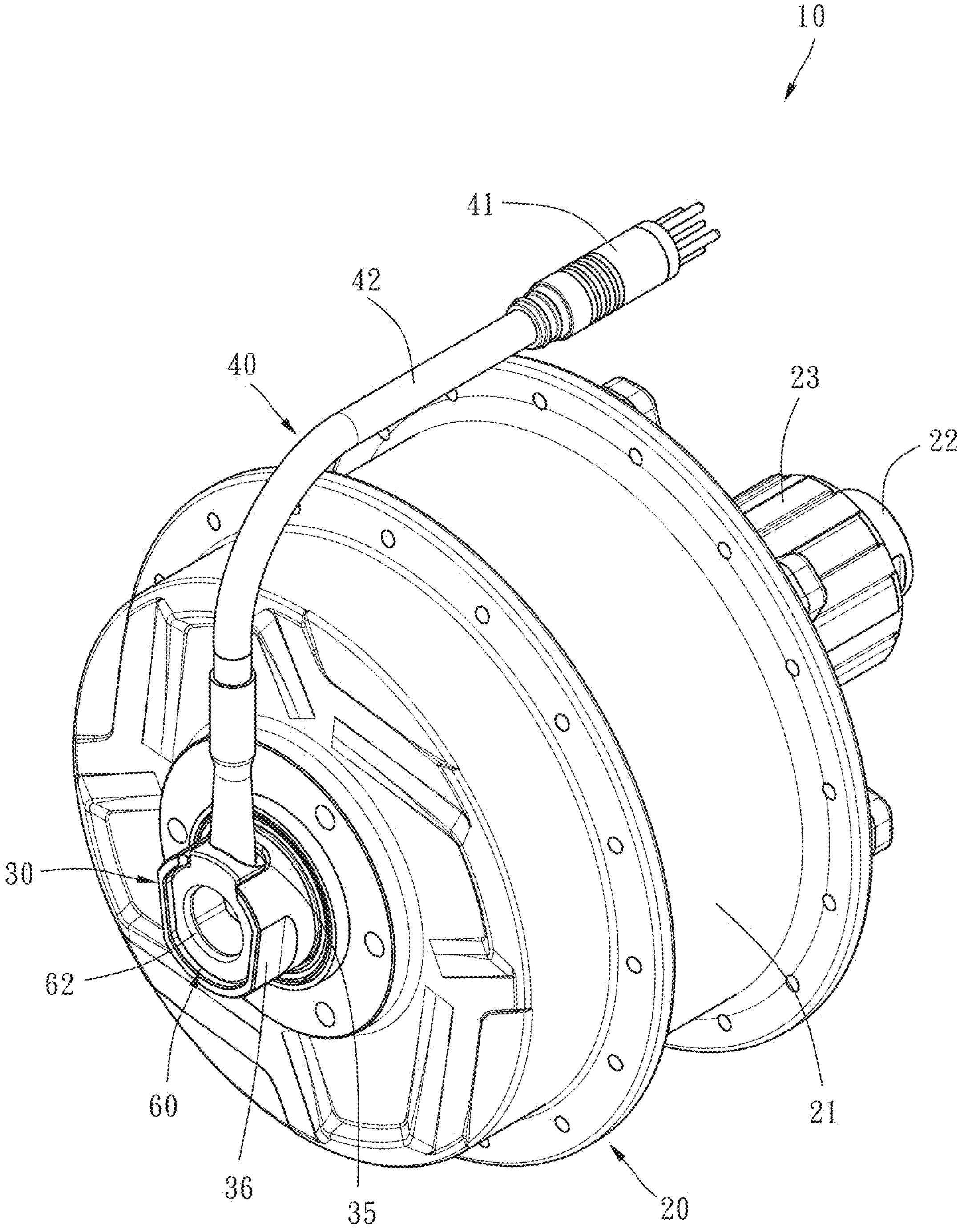
FIG. 1 is a perspective view of a hub motor assembly of a first embodiment of the present invention.
Figure 2:
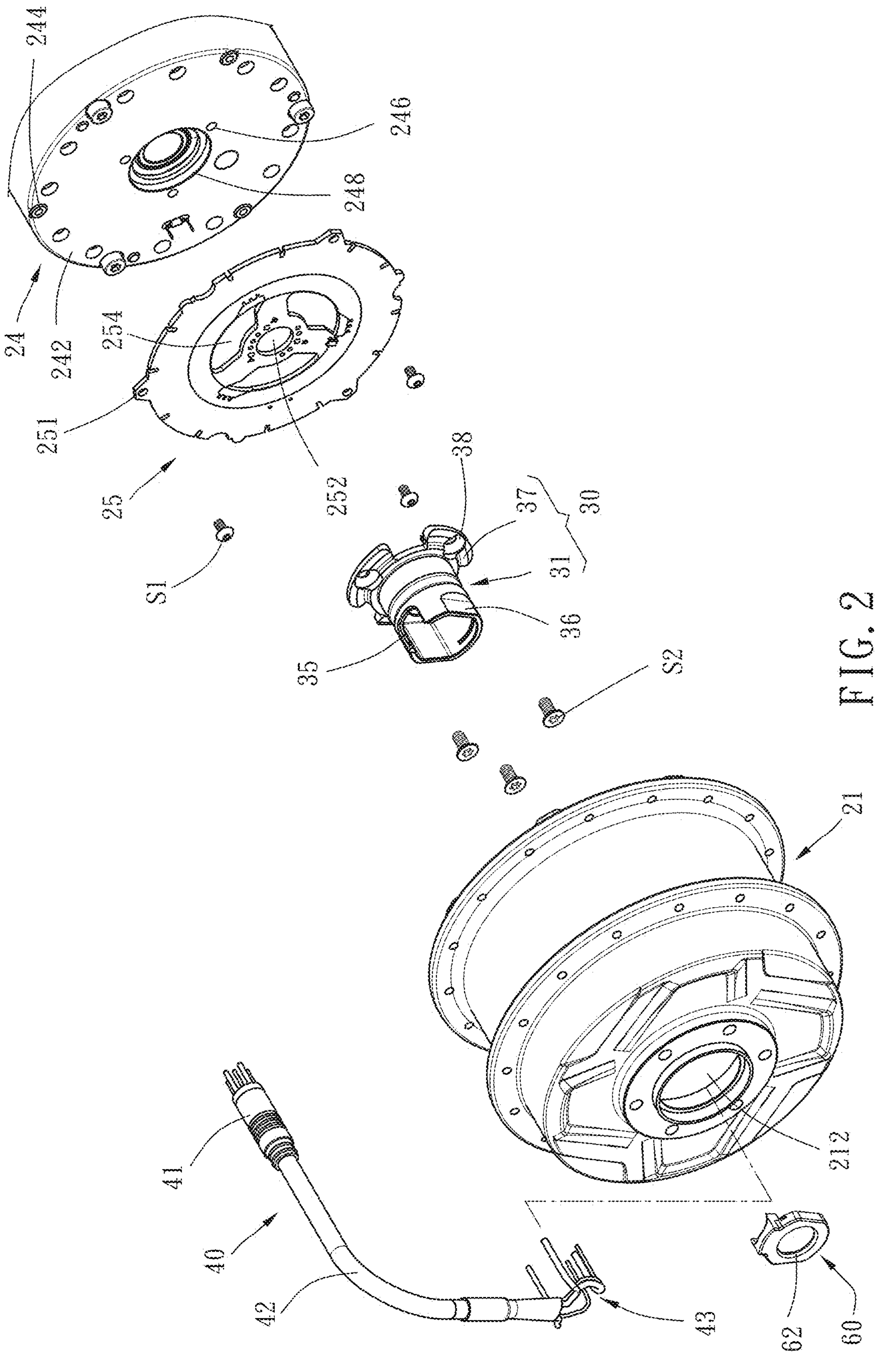
FIG. 2 is a partially exploded view of the hub motor assembly of the first embodiment of the present invention.

Referring to FIGS. 1-2, a hub motor assembly 10 of a first embodiment of the present invention comprises a hub motor 20, a coupling shaft 30, and a power cable 40.

As shown in FIGS. 1-2, the hub motor 20 includes a hub shell 21 and a motor 24 disposed in the hub shell 21. One end of the hub shell 21 has a first shaft hole 212, and the other end of the hub shell 21 is provided with a support shaft 22 and a rachet 23 rotatably disposed on the support shaft 22. The rachet 23 is connected to the motor 24 through a reduction gear set (not shown) disposed in the hub shell 21, such that the rachet 23 is driven by the motor 24 to rotate. In addition, the motor 24 includes an outer end surface 242 facing the first shaft hole 212 and having a plurality of first screw holes 244 and a plurality of second screw holes 246 and penetrated by a motor shaft hole 248 for a quick-release shaft (not shown) to pass through. The hub motor 20 further includes a circuit board 25 disposed in the hub shell 21. The outer periphery of the circuit board 25 has a plurality of first through holes 251. A plurality of first screws S1 are screwed to the first screw holes 244 through the first through holes 251, such that the circuit board 25 is fixed to the outer end surface 242 of the motor 24. In addition, the circuit board 25 further includes a second through hole 252 for penetration of the quick-release shaft (not shown) and three hollow portions 254 arranged in an equally-spaced manner around the second through hole 252. Because the hub motor 20 is not the key point of the present invention, the detailed configuration and operational theorem thereof will not be repeatedly mentioned hereunder.

Figure 3:
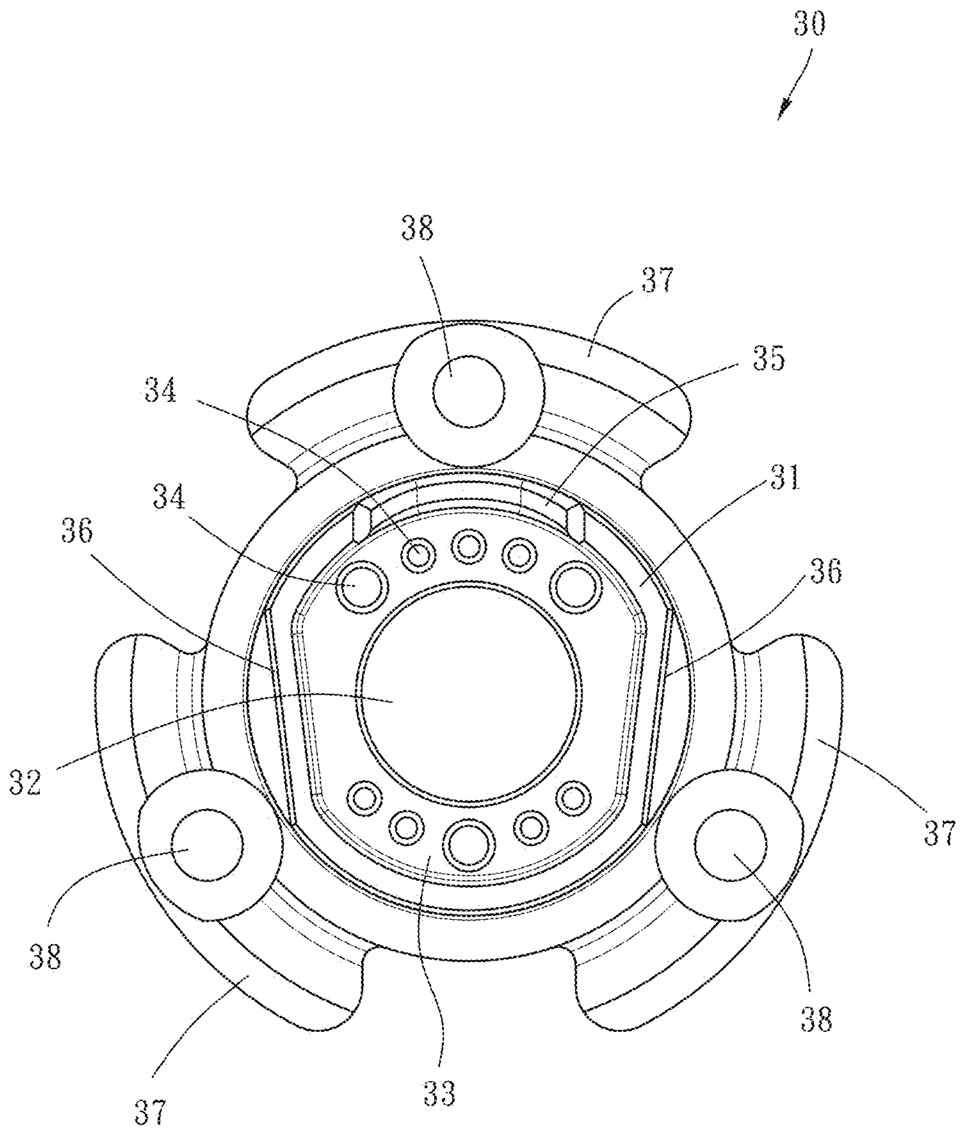
FIG. 3 is an end view of a coupling shaft provided by the hub motor assembly of the first embodiment the present invention.

As shown in FIGS. 2 and 3, the coupling shaft 30 includes an outer shaft portion 31. The outer shaft portion 31 has a second shaft hole 32 for penetration of the quick-release coupling shaft (not shown). An inner annular portion 33 radially protrudes from the periphery wall of the second shaft hole 32 and has a plurality of wire holes 34 (the arrangement is not limited). One end of the outer shaft portion 31 has a notch 35 radially communicating with the second shaft hole 32 and two opposite anti-rotation planes 36. The coupling shaft 30 is prevented from being rotated by the anti-rotation planes 36 resting against a rear fork (not shown). In addition, the coupling shaft 30 further includes three wing portions 37 radially connected to the other end of the outer shaft portion 31 and each having a counterbored hole 38. On one hand, the outer shaft portion 31 of the coupling shaft 30 is coaxially inserted through the first shaft hole 212 of the hub shell 21, and a bearing 26 is provided between the coupling shaft 30 and the first shaft hole 212, such that the hub shell 21 is rotated relative to the coupling shaft 30. On the other hand, the wing portions 37 of the coupling shaft 30 passes through the hollow portions 254 of the circuit board 25, and are then fixed to the outer end surface 242 of the motor 24 by inserting three second screws S2 through the counterbored holes 38 and locking them into the second screw holes 246.

Figure 4:
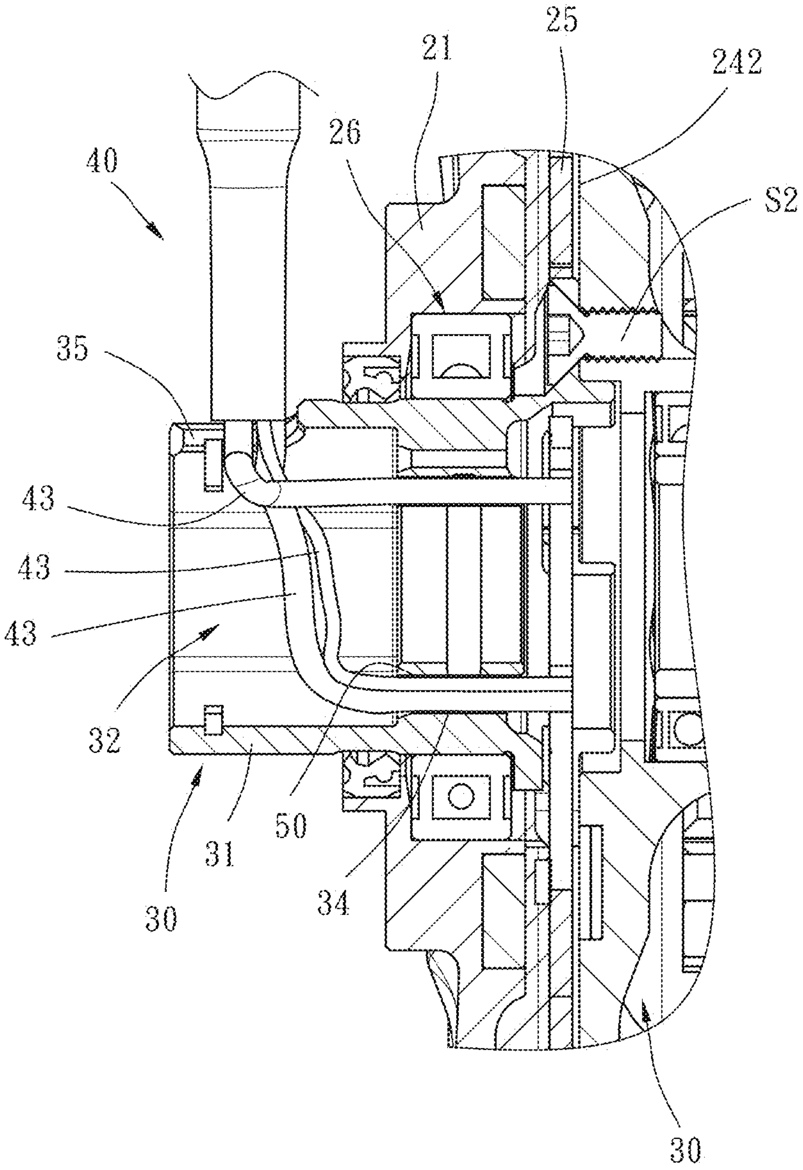
FIG. 4 is a partially sectional view of the hub motor assembly of the first embodiment of the present invention.

As shown in FIGS. 2 and 4, the power cable 40 has a plug 41, a sheath 42, and a plurality of core wires 43. One end of the sheath 42 is connected to the plug 41, while the other end of the sheath 42 is adjacent to the notch 35 of the coupling shaft 30 but not inserted into the second shaft hole 32. The core wires 43 are inserted in the sheath 42 and each have one end thereof connected to the plug 41. The other ends of the core wires 43 are electrically connected to the circuit board 25 by soldering in such a way that the core wires 43 pass through the notch 35 of the coupling shaft 30 into the second shaft hole 32 of the coupling shaft 30, and then pass through the wire holes 34 of the coupling shaft 30 into the hub shell 21. It should be additionally noted that to prevent the core wires 43 from loosening from the wire holes 34, an adhesive 50 can be directly poured into the wire holes 34 to secure the core wires 43, thereby enhancing the structural stability of the core wires 43. In addition, as shown in FIGS. 1 and 2, the coupling shaft 30 can be further provided with an end cap 60. The end cap 60 closes one end opening of the second shaft hole 32 to prevent external foreign objects from entering the second shaft hole 32 and damaging the core wires 43. Additionally, an end hole 62 is provided at the end cap 60 for the quick-release shaft to pass through.

Figure 5:
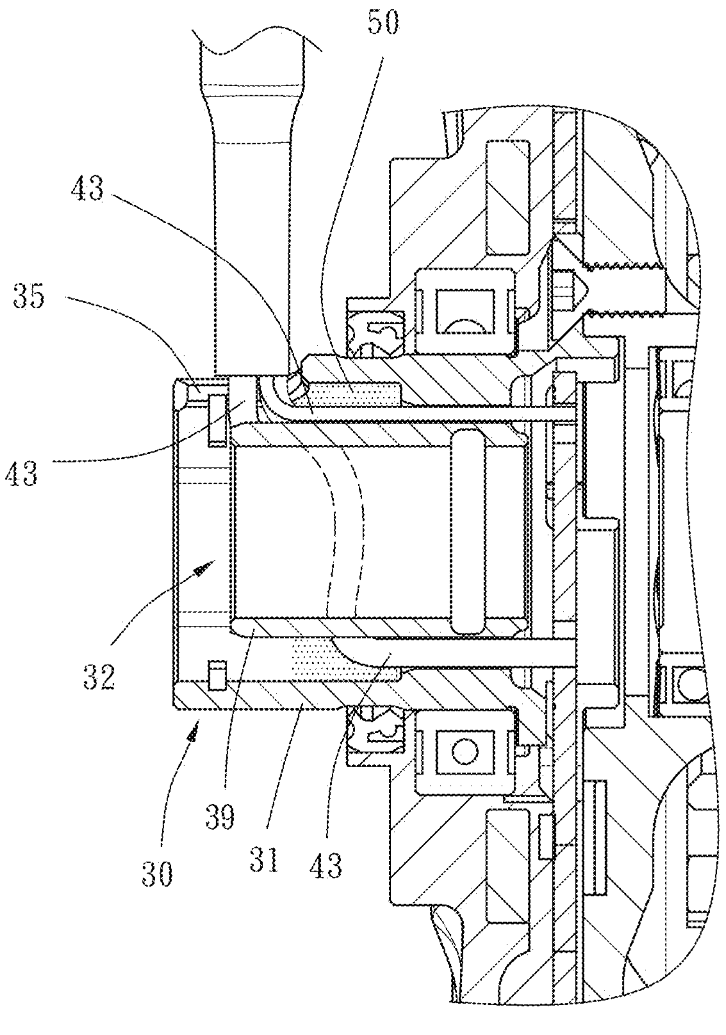
FIG. 5 is a partially sectional view of the hub motor assembly of a second embodiment of the present invention.

Referring to FIG. 5, in the second embodiment of the present invention, the coupling shaft 30 has an inner shaft portion 39 extending from the inner periphery of the inner annular portion 33 towards the notch 35 along the axial direction of the second shaft hole 32. The core wires 43 are separated from the quick-release shaft by using configuration of the inner and outer shaft portions 39, 31 to prevent the core wires 43 and the quick-release shaft from interfering with each other and causing damage to the core wires 43. Additionally, an adhesive 50 can be injected between the inner shaft portion 39 and the outer shaft portion 31 to secure the core wires 43, thereby enhancing the structural stability of the core wires 43.

As indicated above, the hub motor assembly 10 of the present invention uses the wire holes 43 to separate the core wires 43 and then fix them to the circuit board 25. This not only facilitates assembly of the power cable 40 but also prevents the power cable 40 from being bent at excessive angles, thereby reducing the risk of damage.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A hub motor assembly comprising:

a hub motor including a hub shell having a first shaft hole at one end thereof, a motor disposed in the hub shell and having an outer end surface facing the first shaft hole, and a circuit board disposed in the hub shell and fixed to the outer end surface of the motor;

a coupling shaft penetrated in the first shaft hole of the hub shell and fixed to the outer end surface of the motor, the coupling shaft including a second shaft hole, a notch radially communicating with the second shaft hole, and an inner annular portion radially protruding from a periphery wall of the second shaft hole and having a plurality of wire holes arranged in a spaced manner; and a power cable having a plurality of core wires each provided with one end inserted into the second shaft hole of the coupling shaft through the notch of the coupling shaft and inserted into the hub shell through the wire holes of the coupling shaft to be electrically connected to the circuit board.

2. The hub motor assembly as claimed in claim 1, wherein the coupling shaft includes an outer shaft portion inserted into the first shaft hole of the hub shell and having the notch, the second shaft hole, and the inner annular portion, and a wing portion connected to an outer surface of the outer shaft portion and fixed to the outer end surface of the motor.

3. The hub motor assembly as claimed in claim 2, wherein the coupling shaft further includes an inner shaft portion extending from an inner periphery of the inner annular portion towards the notch along an axial direction of the second shaft hole; the core wires are located between the inner shaft portion and the outer shaft portion.

4. The hub motor assembly as claimed in claim 3, wherein an adhesive is poured between the inner shaft portion and the outer shaft portion to secure the core wires.

5. The hub motor assembly as claimed in claim 1, wherein an adhesive is poured in the wire holes to secure the core wires.

6. The hub motor assembly as claimed in claim 1, wherein an end cap is mounted to the coupling shaft and closing one end opening of the second shaft hole.

* * * * *